United States Patent Office 3,312,718
Patented Apr. 4, 1967

3,312,718
PREPARATION OF BUTYROLACTONE
Marvin Z. Woskow, Houston, Tex., assignor to Petro-Tex Chemical Corporation, Houston, Tex., a corporation of Delaware
No Drawing. Filed Jan. 22, 1964, Ser. No. 339,350
6 Claims. (Cl. 260—343.6)

This invention relates to the preparation of butyrolactone.

An improved method for preparing butyrolactone is provided by this invention which comprises hydrogenating succinic anhydride in the presence of a hydrogenation catalyst and silicotungstic acid to provide substantially complete conversion of the succinic anhydride to butyrolactone. The reaction is conducted at an elevated temperature under pressure maintained with hydrogen, with the succinic anhydride in liquid phase in a molar ratio of one mol of succinic anhydride and at least two mols of hydrogen, in the presence of a catalytic amount of a hydrogenating metal and silicotungstic acid.

The reaction is conducted at temperatures from about 200° C. to about 300° C. and excellent results are obtained in the range of about 225° C. to about 275° C. The pressure of the reaction is maintained by hydrogen and is in the range of about 500 p.s.i.g. to about 2000 p.s.i.g. At temperatures below about 200° C. and pressures of less than 500 p.s.i.g., the reaction proceeds very slowly; and at pressures greatly in excess of about 2000 p.s.i.g. and temperatures above 300° C., undesirable by-products may be formed.

Any hydrogenating metal may be used, including cobalt, nickel, rhenium, ruthenium, palladium, platinum and the like. Excellent results have been obtained with nickel, which may be prepared in ways known to those skilled in the art, as in pellet or fine powder form. One useful method is to impregnate kieselguhr or other suitable carriers with a decomposable nickel salt, such as nickel nitrate or nickel carbonate. The salt is then decomposed under conditions to form nickel metal in finely divided form as at temperatures of about 200° C. to 300° C. The catalyst is normally used in particles of from over 300 mesh size to ¼ inch. The amount of nickel metal in such supported catalysts normally is greater than about 5 percent. Raney nickel may also be used. The amount of hydrogenating catalyst used will be from about 0.5 to 15 weight percent based on the succinic anhydride.

The silicotungstic acid is used in varying amounts and is preferably employed deposited on a carrier as alumina preferably, silica, kieselguhr, pumice and the like. One method for preparing this material is to mix silicotungstic acid with aluminum hydroxide gel, form a paste, extrude and dry at a temperature of from 100° C. to 150° C. The amount of silicotungstic acid employed may be varied from about 2 to about 25 weight percent. The dried mixture of silicotungstic acid and alumina is calcined at 400° C. to 500° C. A useful form of this material is pellets from ⅛ to ¼ inch in diameter. A useful material may also be prepared by impregnating a carrier, as ⅛ inch activated alumina pellets, with a solution of the heteropoly acid, drying, and calcining. The amount of silicotungstic acid additive used in the reaction is based on the amount of hydrogenation catalyst employed and will vary from about 5 to 100 weight percent of the hydrogenation catalyst. Large amounts may be used but are not necessary.

It has also been found that improved results are obtained if the butyrolactone is removed from the reactor as it is formed. One way to do this is to vent hydrogen from the reactor during the course of the reaction at a rate to remove at least some of the butyrolactone as it is formed while still maintaining the required pressure on the system by adding hydrogen thereto. Preferably, the rate of venting of hydrogen from the reactor is such that the butyrolactone is removed as it is formed. The flow rate of hydrogen may vary over wide ranges, as will be apparent to those skilled in the art, and is readily determined. In a vertical one-gallon autoclave 5 inches in diameter and 12 inches high, excellent results were obtained at a flow rate of hydrogen from the autoclave of between 10 and 30 cubic feet per hour at 1000 p.s.i.g. and 250° C. Improved results are obtained at flow rates of 3 to 50 cubic feet of hydrogen per hour through a one-gallon reactor under equivalent conditions. Excessive venting of hydrogen is not necessary and often only small amounts of hydrogen will be vented.

In an embodiment of this invention, 1000 grams of succinic anhydride, 100 grams of nickel kieselguhr hydrogenating catalyst as ⅛ inch pellets and containing 59 weight percent nickel, and 50 grams of silicotungstic acid deposited on alumina at a concentration of 10 weight percent in the form of ⅛ inch pellets, were charged to a one-gallon stirred autoclave. The effluent line from the reactor led into Dry Ice-acetone cooled traps to condense the reaction products. The autoclave was flushed with nitrogen. Hydrogen was fed into the autoclave and the mixture was heated with stirring to 250° C. and a pressure of 1000 p.s.i.g. An anchor type agitator was employed to obtain thorough mixing and dispersion of the hydrogenating catalyst. The reaction was allowed to run for 3.5 hours, during which time hydrogen was vented from the reactor at a rate of 20 cubic feet per hour. Substantially complete conversion of succinic anhydride to butyrolactone was obtained by the end of the reaction and was collected in the traps. The butyrolactone was then distilled to provide the product of 99.8 percent purity. When this reaction was repeated with ruthenium and then palladium as the hydrogenating catalysts, excellent results were obtained. When the reaction was repeated in the absence of silicotungstic acid, only 50 percent of the succinic anhydride was converted to butyrolactone. The hydrogen may be recycled back to the reactor if desired. While this reaction may be carried out with suitable solvent, as dioxane, it is one of the advantages of this invention that a solvent is not required, which simplifies both the reaction and purification of the subsequent products. The process may be conducted in a continuous system.

Butyrolactone is a stable, non-corrosive solvent that is liquid at a temperature range of −44° C. to 204° C. It is useful in the solvent welding of plastic films, as a swelling agent for cellulose acetate films, and as a chemical intermediate to form, for example, pyrrolidone.

I claim:

1. A process for preparing butyrolactone which comprises hydrogenating succinic anhydride in the presence of a metal hydrogenation catalyst and silicotungstic acid at a temperature from about 200° C. to about 300° C. and a pressure of above 500 p.s.i.g.

2. A process for preparing butyrolactone which comprises hydrogenating succinic anhydride in the presence of catalytic amounts of a hydrogenating metal and silicotungstic acid at a temperature from about 225° C. to about 275° C. and a pressure between about 500 p.s.i.g. and 2000 p.s.i.g.

3. A process for preparing butyrolactone which comprises hydrogenating succinic anhydride in a reaction zone in the presence of catalytic amounts of a nickel hydrogenating metal and silicotungstic acid at a temperature in the range of about 225° C. to about 275° C. and a pressure of from about 500 p.s.i.g. to about 2000 p.s.i.g., and removing the butyrolactone in vapor form from the reaction zone during the reaction.

4. The process of claim 1 wherein the metal hydrogenating catalyst is nickel.

5. The process of claim 1 wherein the metal hydrogenating catalyst is palladium.

6. The process of claim 1 wherein the metal hydrogenating catalyst is ruthenium.

References Cited by the Examiner

UNITED STATES PATENTS 2,072,861  3/1937  Amend et al. _____ 260—343.6

WALTER A. MODANCE, *Primary Examiner.*

JAMES A. PATTEN, *Assistant Examiner.*